(12) United States Patent
Catheline et al.

(10) Patent No.: US 12,440,185 B2
(45) Date of Patent: Oct. 14, 2025

(54) METHOD FOR DETERMINING A MECHANICAL PROPERTY OF A LAYERED SOFT MATERIAL

(71) Applicants: INSTITUT NATIONAL DE LA SANTE ET DE LA RECHERCHE MEDICALE (INSERM), Paris (FR); UNIVERSITÉ CLAUDE BERNARD LYON 1, Villeurbanne (FR); CENTRE LÉON-BÉRARD, Lyons (FR)

(72) Inventors: Stefan Catheline, Lyons (FR); Jean-Yves Chapelon, Lyons (FR); Cyril Lafon, Lyons (FR)

(73) Assignees: INSTITUT NATIONAL DE LA SANTE ET DE LA RECHERCHE MEDICALE (INSERM), Paris (FR); UNIVERSITÉ CLAUDE BERNARD LYON 1, Villeurbanne (FR); CENTRE LEON-BERARD, Lyons (FR)

( * ) Notice: Subject to any disclaimer, the term of this patent is extended or adjusted under 35 U.S.C. 154(b) by 1007 days.

(21) Appl. No.: 15/778,703

(22) PCT Filed: Nov. 25, 2016

(86) PCT No.: PCT/EP2016/078761
§ 371 (c)(1),
(2) Date: May 24, 2018

(87) PCT Pub. No.: WO2017/089511
PCT Pub. Date: Jun. 1, 2017

(65) Prior Publication Data
US 2018/0348168 A1 Dec. 6, 2018

(30) Foreign Application Priority Data
Nov. 26, 2015 (EP) .................................... 15306878

(51) Int. Cl.
*A61B 8/00* (2006.01)
*A61B 8/08* (2006.01)
(Continued)

(52) U.S. Cl.
CPC ................ *A61B 8/485* (2013.01); *A61B 8/10* (2013.01); *A61B 8/4477* (2013.01); *A61N 7/02* (2013.01);
(Continued)

(58) Field of Classification Search
CPC ......... A61B 8/485; A61B 8/4477; A61B 8/10; A61B 8/4494; A61B 8/0858; A61B 8/085;
(Continued)

(56) References Cited

U.S. PATENT DOCUMENTS 6,039,691 A * 3/2000 Walker .................... A61B 8/10
600/443
2007/0035203 A1* 2/2007 Bromfield ............. B06B 1/0238
310/311
(Continued)

FOREIGN PATENT DOCUMENTS

WO 2015/119861 A1 8/2015

OTHER PUBLICATIONS

Zhang et al. "Measurement of Quantitative Viscoelasticity of Bovine Corneas Based on Lamb Wave Dispersion Properties", Ultrasound in Medicine & Biology, vol. 41, Issue 5, May 2015, pp. 1461-1472 (Year: 2015).*

(Continued)

*Primary Examiner* — Joel Lamprecht
*Assistant Examiner* — Amy Shafqat
(74) *Attorney, Agent, or Firm* — WCF IP

(57) ABSTRACT

This method for determining a mechanical property of a layered soft material, includes steps of a) generating an
(Continued)

ultrasound wave (W1) focused towards a first point (P1) of the material, said wave, upon interacting with a layer of said material, generating in turn a Lamb (L1) wave propagating into said layer of the material, b) measuring, at a second point (P2) of the material belonging to said layer, a physical parameter of the generated Lamb wave, c) automatically determining the mechanical property of the layered soft material, based on the measured physical parameter. Step a) is performed by exciting a first ultrasonic transducer (401) with a first excitation signal (S401) during at most 50 ms, step b) is performed by exciting a second ultrasonic transducer (402) with a second excitation signal (S402) during at most 0.5 ms, to generate multiple excitation ultrasound waves (W2) focused towards said second point (P2) and, then, collecting multiple reflected waves (W2') emitted in response, said first and second ultrasonic transducers each comprises an oscillator having a quality factor equal to or superior to 100, preferably equal or superior to 1000.

13 Claims, 4 Drawing Sheets

(51) Int. Cl.
*A61B 8/10* (2006.01)
*A61F 9/007* (2006.01)
*A61N 7/00* (2006.01)
*A61N 7/02* (2006.01)
*G01N 29/04* (2006.01)
*G01S 7/52* (2006.01)
*G01S 15/89* (2006.01)

(52) U.S. Cl.
CPC ........ *G01N 29/041* (2013.01); *G01S 7/52042* (2013.01); *G01S 15/8927* (2013.01); *A61B 8/0858* (2013.01); *A61B 8/4494* (2013.01); *A61B 8/54* (2013.01); *A61F 9/00781* (2013.01); *A61N 2007/0052* (2013.01); *G01S 7/52022* (2013.01); *G01S 15/8922* (2013.01)

(58) Field of Classification Search
CPC .. A61B 8/4444; A61B 8/5223; G01N 29/041; G01N 2291/0231; G01N 2291/0427; G01S 7/52042; G01S 15/8927; G01S 15/8922; G01S 7/52022; A61N 7/02; A61N 2007/0052; A61N 2007/0095; A61F 9/00781; G16H 50/30
See application file for complete search history.

(56) References Cited

U.S. PATENT DOCUMENTS

| | | | |
|---|---|---|---|
| 2011/0009779 A1* | 1/2011 | Romano | A61N 7/02 601/2 |
| 2011/0118600 A1* | 5/2011 | Gertner | A61B 6/032 600/439 |
| 2014/0058294 A1 | 2/2014 | Gross et al. | |
| 2014/0296709 A1 | 10/2014 | Fatemi et al. | |
| 2015/0320533 A1 | 11/2015 | King | |

OTHER PUBLICATIONS

Couade et al. "Quantitative Assessment of Arterial Wall Biomechanical Properties Using Shear Wave Imaging", Ultrasound Med Biol. Oct. 2010;36(10):1662-76. doi: 10.1016/j.ultrasmedbio.2010.07.004 (Year: 2010).*

Chistiakova et al., "Photoelastic ultrasound detection using ultra-high-Q silica optical resonators", Optics Express, vol. 22, Issue 23, pp. 28169-28179 (2014) (Year: 2014).*

Tanter et al., "High-Resolution Quantitative Imaging of Cornea Elasticity Using Supersonic Shear Imaging", IEEE Transactions on Medical Imaging, vol. 28, No. 12 (Year: 2009).*

\* cited by examiner

METHOD FOR DETERMINING A MECHANICAL PROPERTY OF A LAYERED SOFT MATERIAL

TECHNICAL FIELD OF THE INVENTION

This invention relates to a method for determining a mechanical property of a layered soft material. This invention also relates to a method for testing the effect of an apparatus for creating thermal lesions in a layered soft material. This invention also relates to an apparatus for measuring a mechanical property of a layered soft material.

BACKGROUND OF THE INVENTION

Shear wave elastography has been known for several years as an efficient technique for detecting an inhomogeneity of elasticity in a soft material. This technique is based on the detection of shear waves propagation speed. Such a detection can be based on an ultrasonic technology or on a magnetic resonance imaging technology.

WO 2004/021038 A1 discloses an imaging method and device employing shear waves in order to determine a mechanical property of a soft material. In this known device, an ultrasound wave is emitted by a network of ultrasonic transducers in order to generate a shear wave in the soft material. This same network of transducers is then used to detect the propagation of the shear wave inside the material, in order to measure a physical parameter of this shear wave, thus allowing determining a mechanical property of the soft material. However, this method has the disadvantage of requiring an array of imaging ultrasonic transducers made of a large number of transducers. Due to this large number of transducers, during the step of measuring the propagation of the shear wave, the processing of the measured data is complicated because one measurement signal comes from each of these many transducers. Additionally, the size of the array is generally quite large which can be a hindrance, especially if the material to be measured is quite small.

SUMMARY OF THE INVENTION

The invention aims at providing a method for determining a mechanical property of a layered soft material, which is easy to use and which can be implemented using simplified measurement apparatus.

To this end, the invention concerns a method for determining a mechanical property of a layered soft material, including steps of:
a) generating an ultrasound wave focused towards a first point of the material, said wave, upon interacting with a layer of said material, generating in turn a Lamb wave propagating into said layer of the material,
b) measuring, at a second point of the material belonging to said layer, a physical parameter of the generated Lamb wave,
c) automatically determining the mechanical property of the layered soft material, based on the measured physical parameter,
wherein
step a) is performed by exciting a first ultrasonic transducer with a first excitation signal during at most 50 ms,
step b) is performed by exciting a second ultrasonic transducer with a second excitation signal during at most 0.5 ms, to generate multiple excitation ultrasound waves focused towards said second point and, then, collecting multiple reflected waves emitted in response, said first and second ultrasonic transducers each comprises an oscillator having a quality factor equal to or superior to 100, preferably equal or superior to 1000.

In the invention, as opposed to the prior art, the first and second ultrasonic transducers have ultrasonic emission properties that make them suitable for therapeutic applications. Such ultrasonic transducers differ from classical ultrasonic transducers in that they have a narrow bandwidth and high resonance properties. Because of these features, they have so far been deemed as unsuited for imaging applications, especially because of their high resonance properties. By using therapeutic ultrasonic transducers in order to perform imaging operations, it is possible to obtain precise results without having to use known imaging transducer arrays, which greatly simplifies the implementation of this method.

A further advantage of the invention is that the same ultrasonic transducer can be used in order to modify structurally a soft material, for example by creating a thermal lesion in this material by using high intensity focused ultrasound waves, and to measure mechanical properties of this material. It is thus possible to monitor in real time whether the thermal lesions have been created or not. Classically, it would have been necessary to use different sets of ultrasonic transducers: a first set to create said thermal lesions and then a second set to measure a property of the material in order to check whether this creation has been successful or not. Under such circumstances, a complicated apparatus would have been required for controlling the transducers, which is not necessary with the invention. Another inconvenient of the known devices is that it is time-consuming to repeatedly move and reposition precisely these different transducers. A further consequence is that the material must be handled multiple times in order to successively position the different sets of ultrasonic transducers, which can be deeply problematic if the soft material is fragile, for example if it is a biological organ such as an eye. By using a single device for creating lesions and for detecting said lesions, no such handling is necessary.

According to further aspects of the invention which are advantageous but not compulsory, the method might incorporate one or several of the following features, taken in any technically admissible configuration:

The mechanical property of the layered material is representative of the elasticity of said layer of the material.
The measured physical parameter is the average propagation speed of the Lamb wave between the first and second points of the material.
The measured physical parameter is representative of the amplitude of the Lamb wave at the second point of the material.
The layered soft material is an eye, and said layer is a cornea of said eye.
The ultrasound wave of step a) has a frequency comprised between 1 MHz and 50 MHz.
In step b), said physical parameter of the Lamb wave is obtained automatically from the collected multiple reflected ultrasound waves using a speckle tracking method.
The ultrasound wave generated during step a) is a high-intensity focused ultrasound wave.

The invention also concerns a method for testing the effect of an apparatus for creating thermal lesions in a layered soft material, comprising:

d) providing an apparatus for creating thermal lesions in a layered soft material, comprising first and second ultrasonic transducers,
e) measuring a mechanical property of a layered soft material,
f) generating a high intensity ultrasound wave focused towards a target region of said material, in order to create a thermal lesion in this target region, by exciting an ultrasonic transducer of said apparatus with an excitation signal during at least 0.5 seconds,
g) measuring again the same mechanical property of said layered soft material,
h) automatically comparing the results of the measurements of steps e) and g), step f) being said to have had a successful effect if the mechanical properties measured during steps e) and g) differ from each other by more than 1%, preferably 75%, step f) being said to have had an unsuccessful effect otherwise, wherein
    steps d) and f) are performed using said apparatus, according to the method for determining a mechanical property according to the invention,
    step e) is performed using said first ultrasonic transducer.

The invention further concerns an apparatus for measuring a mechanical property of a layered soft material, comprising
    a first ultrasonic transducer, configured to generate an ultrasound wave towards a first point of a layered soft material, in order to generate in turn a Lamb wave propagating into a layer of said material,
    at least one second ultrasonic transducer, configured to measure a physical parameter of the generated wave Lamb at a second point of the material, said second point belonging to said layer, said second ultrasonic transducer being configured, to that end, to generate multiple excitation ultrasound waves focused towards said second point, and to collect multiple reflected ultrasound waves reflected in response by said material,
wherein
    the apparatus further comprises:
        a first ultrasonic driver of the first ultrasonic transducer, configured to deliver a first excitation signal to said first ultrasonic transducer in order to generate said ultrasound wave, the first excitation signal having a duration smaller than or equal to 50 ms.
        a second ultrasonic driver of the at least one second ultrasonic transducer, configured to deliver a second excitation signal to the second ultrasonic transducer to generate the excitation ultrasound waves, the second excitation signal having a duration smaller than or equal to 0.5 ms, and configured to collect a measurement signal representative of the physical parameter of the Lamb wave generated by the second ultrasonic transducer upon collecting the reflected ultrasound waves,
        a control unit, programmed to automatically calculate a mechanical property of said material based upon the collected measurement signal,
the first and second ultrasonic transducers each comprise an oscillator having a quality factor equal to or superior to 100, preferably equal or superior to 1000.

According to further aspects of the invention which are advantageous but not compulsory, this apparatus might incorporate one or several of the following features, taken in any technically admissible configuration:
    The first and second ultrasonic transducers are identical.
    The first and second ultrasonic transducers are therapeutic ultrasound transducers.
    The apparatus comprises at least two, preferably at least four, preferably five, second ultrasonic transducers each configured to measure said physical parameter at said second point.

BRIEF DESCRIPTION OF THE DRAWINGS

The invention will be better understood on the basis of the following description which is given in correspondence with the appended figures and as an illustrative example, without restricting the object of the invention. In the annexed figures.

DETAILED DESCRIPTION OF SOME EMBODIMENTS

Figure 1:
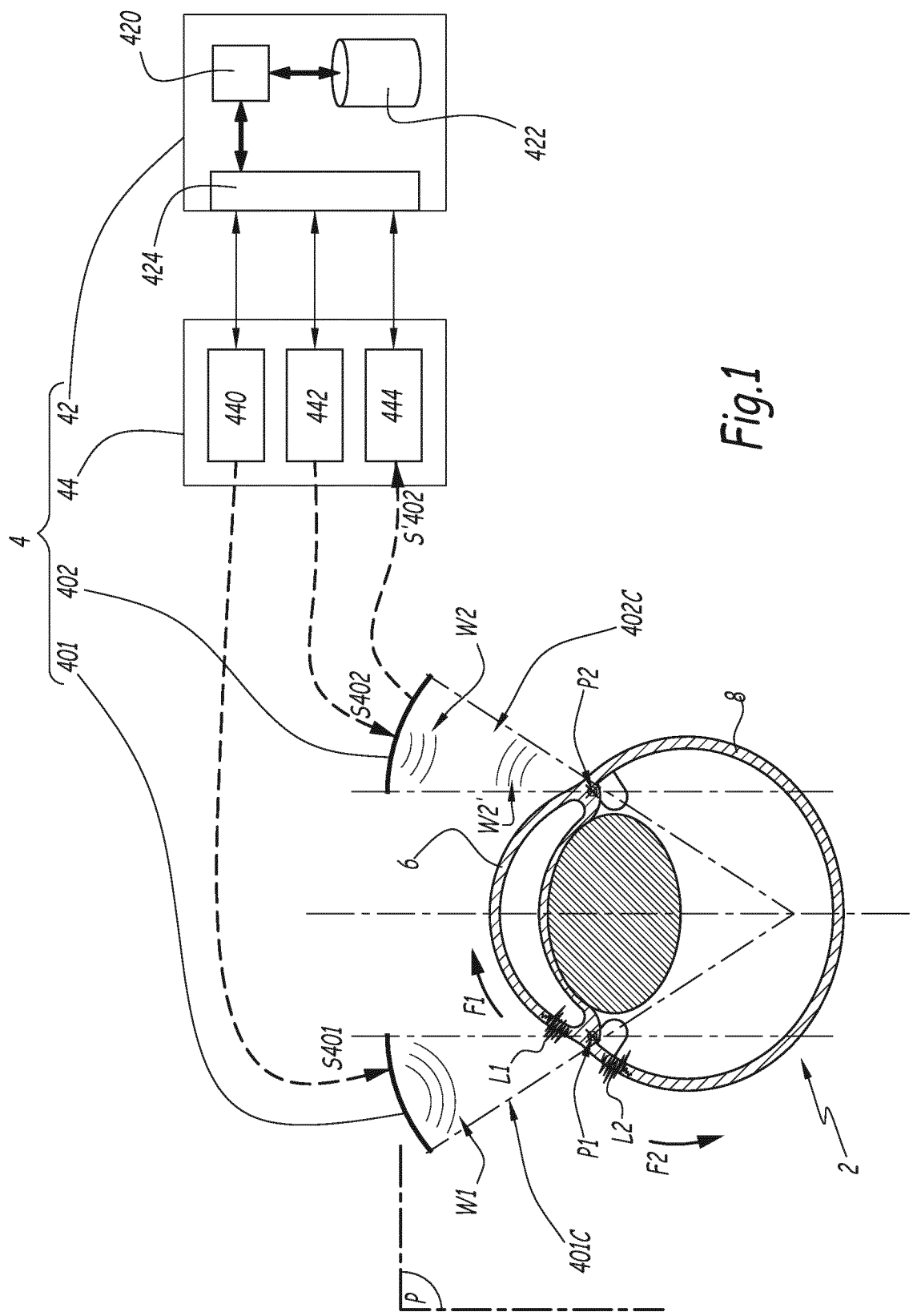
FIG. 1 is a schematic representation of a layered soft material and of an apparatus for determining a mechanical property of this material.

FIG. 1 represents a layered soft material 2 and an apparatus 4 for determining a mechanical property of material 2.

In the meaning of the present invention, a layered soft material is an organic tissue which can be of animal or vegetal origin. For instance, such a soft material can be an organ of a human body, of an animal body, of a fruit or of a vegetable. A soft material can also be food, for example a cheese, or a non-metallic part of prosthesis, made of a natural or synthetic material. By layered, it is meant that the soft material comprises at least one layer. Here, this soft material comprises at least two different layers which differ from each other by at least one physical property.

In this example, soft material 2 is an eye. As is known, an eye is delimited by an external layer made up of a cornea 6 and a sclera 8, forming a first layer of the material 2. Typically, sclera 8 extends so as to form an essentially spherical envelope delimiting the eye, except in a forward region of the eye, where it is prolonged by cornea 6 in the region of the iris of the eye. The eye contains additional components, such as a choroid, a retina or a vitreous humor placed inside this spherical envelope and which form additional layers distinct from the first layer. In FIG. 1, said eye is represented in a transverse sectional view. In order to simplify this FIG. 1, the optical nerve is not shown. In what follows, material 2 may be referred to as eye 2.

The soft material 2 may be a different biological layered material, such as skin, muscular fibers, or a blood vessel.

In this example, the mechanical property of material 2 to be determined is representative of the elasticity of its cornea 6. For example, it is an elasticity coefficient, such as Young's modulus.

Apparatus 4 comprises ultrasonic transducers 401 and 402, and a control unit 42.

Each transducer 401, 402 is configured to generate a focused ultrasound wave in response to an excitation signal. For example each transducer 401, 402 comprises an oscillator, such as an oscillating plate made of a piezoelectric ceramic material. When receiving the excitation signal, the oscillating plate vibrates, thus generating an ultrasound wave that propagates along an emission cone, respectively 401C and 402C. Each cone 401C, 402C, has its base originating from a transducer, respectively, 401 and 402 and converges towards a point of material 2, with an opening angle of at least 30° or 40°. The opening angle of a cone is the internal angle of said cone, measured in a transverse section of said cone containing the axis of said cone, at the apex of said cone. Each transducer 401, 402 is further configured to generate a measurement signal in response to the reception of an ultrasound wave directed towards the oscillator.

In this example, both transducers 401, 402 are therapeutic ultrasonic transducers, based on "high intensity focus ultrasound" technology, abbreviated as HIFU in what follows.

In known therapeutic methods, such HIFU ultrasonic waves of high intensity are used to destroy or damage a biological material, by locally transferring heat to this material. Such methods are used, for example, in the field of cancer treatment or glaucoma treatment.

Therapeutic ultrasonic transducers differ from other ultrasonic transducers, notably imaging ultrasonic transducers, in that they have oscillators featuring strong resonant properties. For example, said oscillator is configured so as to vibrate for several cycles, such as 10 or 100, in response to being excited with a single pulse. Strong resonant properties are desirable, because therapeutic ultrasonic transducers must generate ultrasound waves that carry enough energy in order to successfully create a thermal lesion in the targeted material. On the contrary, imaging ultrasonic transducers must generate short and low-energy ultrasound waves, in order to improve image quality.

The respective oscillators of transducers 401 and 402 have a quality factor superior or equal to 100, preferably 1000. The quality factor, or "Q factor" of an oscillator is defined as the ratio of the resonant frequency of this oscillator over the bandwidth of this oscillator. Similarly, the bandwidth of the transducers 401 and 402 is narrow, for example lower or equal than 1% or than 0.5% or than 1‰.

Transducers 401 and 402 are, in this example, configured to generate an ultrasound wave with a frequency comprised between 1 MHz and 30 MHz, and preferably between 5 MHz and 15 MHz. For example, the resonant frequency of transducers 401 and 402 is equal to 7 MHz.

Here, transducers 401 and 402 are identical.

Figure 2:
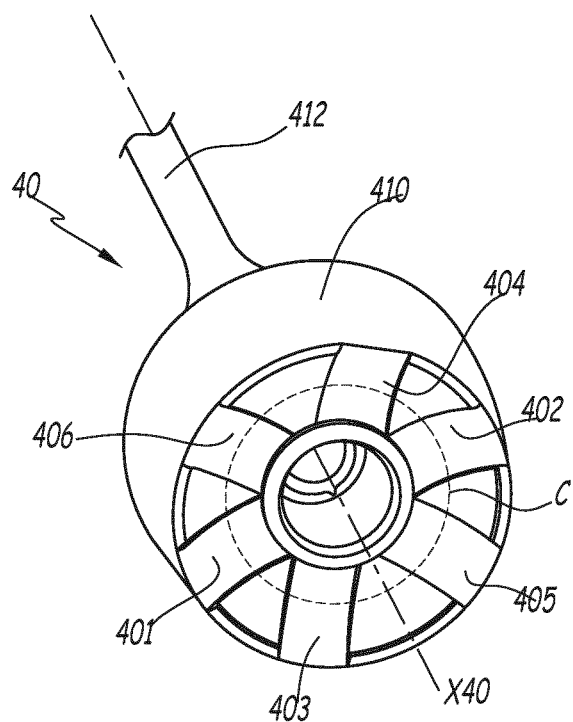
FIG. 2 is a schematic view of an ultrasonic transducer of the apparatus of FIG. 1.

For example, transducers 401 and 402 are part of a transducer unit 40 of apparatus 4, as illustrated in FIG. 2. In this example, transducer unit 40 is an ultrasonic therapy probe sold by the company Eye Tech Care of Rillieux la Pape, France, under the reference "Eye OP1". Transducer unit 40 comprises a plurality of additional transducers, here at the number of four and numbered, 403, 404, 405 and 406 and whose role will be described in what follows. Additional transducers 403 to 406 are, for example, identical to transducer 402. Transducers 401 to 406 are lodged in a housing 410 and are connected to control unit 42 by means of a cable 412. Transducer 401 to 406 are arranged along a circle C on a same essentially concave face of the unit 40 and are regularly spaced from each other. Transducers 401 and 402 are located opposite to each other with respect to a central axis X40 of transducer unit 40, the respective geometrical centers of their respective oscillating plates being comprised in a geometrical plane P aligned with the center of circle C. A contact unit, not shown, extends from said face and is configured to be positioned in direct contact with at least a portion of cornea 6. Said contact unit is configured to allow the transmission of ultrasonic waves between transducers 401 to 406 and the material 2. During operation of the apparatus 4, transducers 401 and 402 are maintained in a fixed position relative to material 2. An example of transducer unit 40 is described in greater detail in EP 2 092 916 A1.

Transducer 401 is configured to generate an ultrasound wave towards a first point P1 of material 2. Here, point P1 is located at a junction between cornea 6 and sclera 8. As is known, when the ultrasound wave generated by transducer 401 reaches point P1, it induces a repeated displacement of cornea 6 and of sclera 8, which in turn generates a low frequency Lamb wave L1 inside cornea 6 and a low frequency Lamb wave L2 inside sclera 8 propagating opposite to Lamb wave L1. The frequency of the Lamb wave is lower than 1 KHz and preferably lower than 500 Hz. Here, it is equal to 100 Hz.

Lamb waves are guided mechanical waves that propagate inside a confined medium such as a thin layer. By "thin", it is meant that the thickness of the layer is at least 100 or 1000 times smaller than each of the length and the width of the layer. In this example, cornea 6 and sclera 8 are thin layers. The properties of Lamb waves are well known and will not be described in detail here.

Transducer 402 is configured to measure a physical parameter of generated Lamb wave L1 at a second point of P2 of material 2 distinct from point P1. Here, point P2 belongs to cornea 6. More precisely, point P2 is located at the junction between cornea 6 and sclera 8 opposite to point P1. Here, points P1 and P2 are comprised in plane P.

In this example, only transducers 401 and 402 are used. In another embodiment, transducers 403 to 406 are also used, conjointly with transducer 402, to measure said physical parameter. In a further embodiment, couples of opposite transducers 403 and 406, and/or 404 and 405 are used sequentially, in the same way as transducers 401 and 402, to generate ultrasonic waves and then to measure said physical parameter.

Control unit 42 is programmed to operate transducers 401 to 406, and especially transducers 401 and 402.

Control unit 42 comprises a data processing unit 420, a data storage unit 422 and an external communication interface 424. For example, control unit 42 is a personal computer. Data processing unit 420 comprises a microprocessor or a programmable microcontroller. Data storage unit 422 comprises a Flash memory module, a hard disc drive or a EEPROM memory module. Data storage unit 422 contains instructions executable by data processing unit 420 in order to execute the method(s) of FIG. 4 and/or FIG. 6. Interface 424 comprises a serial communication port, a USB port or an electrical connector such as a RF connector. Interface 424 may also be a wireless communication interface. Units 420, 422 and interface 424 are linked together by a data communication bus.

Apparatus 4 further comprises a generator unit 44 configured to power transducers 401 to 406.

In this example, apparatus 4 is configured to control transducers 401 and 402 in order to determine the mechanical parameter, and also to perform a HIFU treatment on the material 2.

Generator unit 44 comprises an ultrasonic driver 440 for controlling transducer 401. Upon receiving a command signal from control unit 42, driver 440 delivers an excitation signal S401 towards transducer 401, causing the oscillating plate of said transducer 401 to vibrate and generate the ultrasound wave towards point P1. Here, driver 440 comprises the controller for ultrasonic transducer sold by the company Le Coeur Electronic of Chuelles, France, under the commercial reference "US-KEY".

For example, the excitation signal S401 is a periodical electric signal comprising a plurality of pulses, each pulse being comprised of a plurality of sinusoidal waves with a frequency of 7 MHz and an amplitude of 500 mV, the pulses being repeated with a pulse repetition frequency of 3000 Hz, each pulse having a length of 0.1 ms.

In this example, generator unit 44 comprises the following components connected in series:
- a signal generator sold by company TEKTRONIX of Beaverton Oreg., USA under the reference "AFG30 22B";
- a power amplifier, such as the radiofrequency amplifier sold by the company KMP Electronics of Bedoin, France, under the reference LA 200H/1-60-368-002.

In another embodiment, transducers 401 and 402 are both connected to a single controller, such as the "US-KEY" controller mentioned above, which plays the role of drivers 440 and 442. This single controller is programmed to receive different excitation signals and dispatch them accordingly to transducers 401 or 402. In that case, separate generator units 44 are connected to this single controller, each being configured to generate excitation signals for only one of the transducers connected to this single controller.

Control unit 42 is further programmed to automatically control the operation of transducer 402 in order to measure the physical parameter of the Lamb wave L1 at point P2. In this example, the physical parameter to be measured is the average propagation speed Vm of the Lamb wave L1 between points P1 and P2.

In order to measure this average speed Vm, the transducer 402 is configured to emit multiple excitation waves towards point P2. Therefore, a generator unit 44 also comprises a driver 442 to control transducer 402. This driver 442 is for example identical to driver 440. Upon receiving a command signal from control unit 42, driver 442 delivers an excitation signal S402 towards transducer 402, causing the oscillating plate of transducer 402 to vibrate and generate ultrasound waves towards point P2. For example, excitation signal S402 is an ultrasonic pulse with a duration of one cycle at the resonant frequency of transducer 402, here equal to 7 MHz. Thus, the duration of this pulse is equal to 0.14 μs.

Generator unit 44, further comprises a reception unit 444 configured to collect the measurement electrical signal S'402 emitted by transducer 402 in response to receiving the reflected wave and configured to forward signal S'402 to the control unit 42. Here, transducer 402 is connected to both driver 442 and reception unit 444. Here, driver 442 also serves as reception unit 444.

Figure 3:
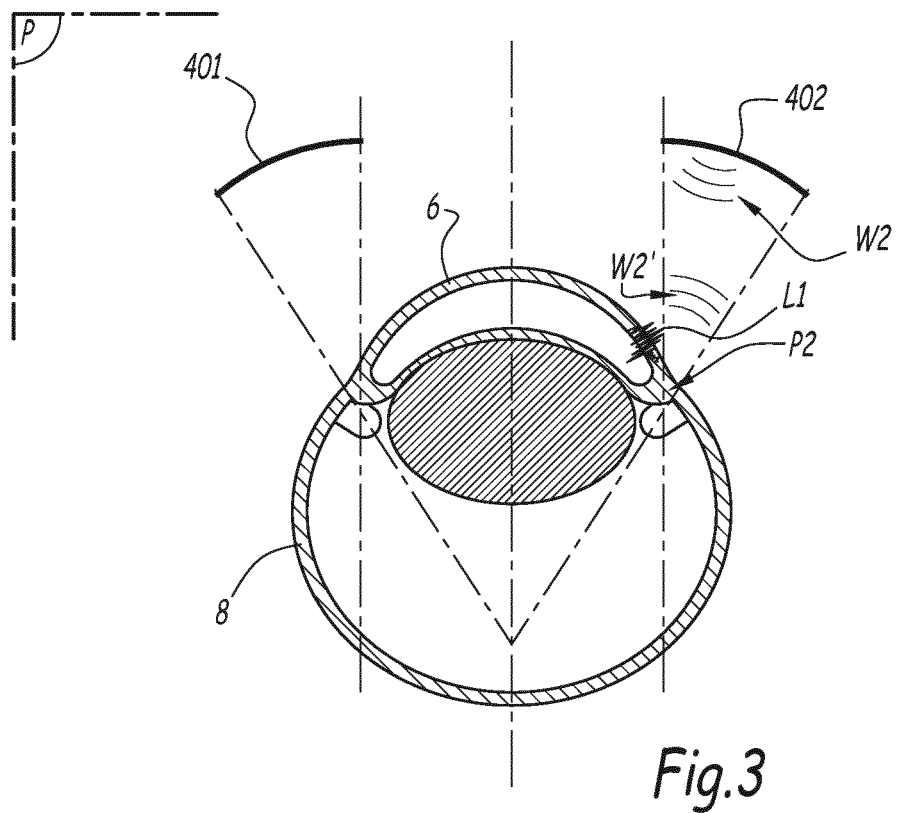
FIG. 3 is a schematic representation similar to a portion of FIG. 1, illustrating the propagation of a Lamb wave in a layer of the soft material of the FIG. 1.

A method for determining said mechanical property of material 2 will now be described in reference to the flow chart of FIG. 4 with the help of FIGS. 1 to 3.

Firstly, during a step 1000, an ultrasound wave W1 is generated by transducer 401 and focused towards point P1. For example, the central unit 42 automatically generates a control signal towards the driver 440 which, in turn, generates excitation signal S401. Transducer 401 is excited with this excitation signal S401 during at most 50 ms and preferably at most 10 ms or 5 ms.

Said generated wave W1 advances towards point P1, where it interacts with cornea 6 and sclera 8, causing a displacement of cornea 6. A low frequency Lamb wave L1 is thus generated in cornea 6 and propagates in cornea 6 towards the opposite end of cornea 6, along lateral and longitudinal directions of the thin layer formed by cornea 6, for example along the direction represented on FIG. 1 by the arrow F1. Lamb wave L1 continues to propagate inside cornea 6 until it encounters the opposite interface between cornea 6 and sclera 8, here at point P2, as illustrated in FIG. 3.

Then, during step 1002, the propagation speed of wave L1 is measured at point P2. This measurement is performed using transducer 402 operating here in a so-called pulse-echo mode.

For example, during a sub-step 1004, multiple excitation ultrasound waves W2, focused toward point P2 are generated by the transducer 402. For example, the transducer 402 is provided, by the driver 442 with excitation signal S402 during a length of at most 5 μs and, preferably, at most 0.5 μs or 0.05 μs. The excitation waves travel towards point P2, where they are reflected, by the surface of cornea 6, back towards transducer 402.

Then, during a sub-step 1006, the reflected waves W2' are collected by transducer 402. The transducer 402 emits, in response, a measurement signal S'402 which is automatically forwarded to measurement unit 444, and then transmitted to the control unit 42. When the Lamb wave L1 reaches point P2, it causes an oscillating displacement of cornea 6 in the immediate vicinity of point P2. The distance between transducer 402 and the surface of the cornea 6 varies in time.

Thus, it is possible to detect the arrival of Lamb wave L1 at point P2 and to observe the variation over time of said displacement. This displacement is measured using a time of flight method, by automatically calculating the time of flight, that is to say the time elapsed between the emission of one of the multiple excitation waves W2 by transducer 402, and the reception by this transducer of that same wave W2' after it has been reflected by the surface of cornea 6 at point P2. The time of flight is calculated during a sub-step 1008 for every one of the multiple waves emitted by transducer 402. During this sub-step, the times of flight for the different multiple waves are combined, using a known speckle tracking algorithm. An example of a speckle tracking algorithm is described in U.S. Pat. No. 5,474,070.

Figure 5:
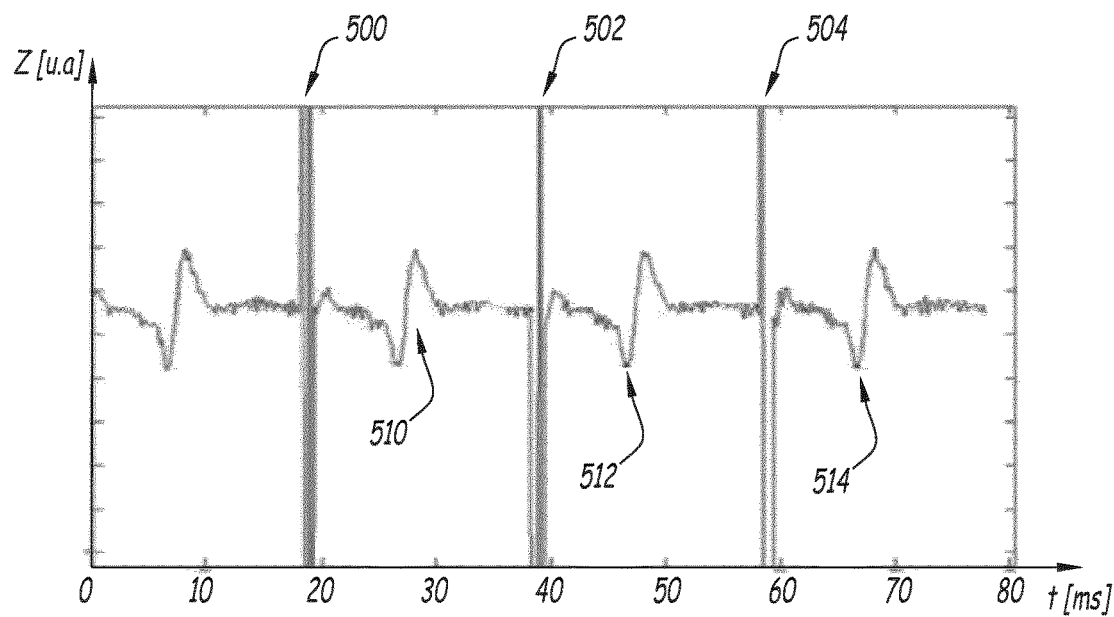
FIG. 5 is a graph illustrating the displacement, as a function of time, of a portion of the material of FIG. 1 as measured by a ultrasonic transducer of the apparatus of FIG. 1.

FIG. 5 illustrates the evolution of the displacement Z as a function of time t.

The displacement Z is measured in a direction perpendicular to the surface of cornea 6 and is expressed here in arbitrary units. In this example, steps 1000 and 1002 have been repeated multiple times. On FIGS. 5, 500, 502 and 504 denote the successive instants of time when ultrasound waves are generated by transducer 401. The arrows 510, 512 and 514 denote the instant of time when each respective Lamb wave L1 arrives at point P2. For example, 510 corresponds to the arrival at point P2 of the Lamb wave generated by the ultrasound wave generated at instant 500. The same goes with instants of time 512 and 514, with respect to the instants of time 502 and 504.

Then during a sub-step 1010, the average propagation speed of Lamb wave L1 is automatically calculated by control unit 42, using the time of flight data obtained during sub-step 1008. For example, control unit 42 automatically calculates the time difference between instant of time 510 and 500. The propagation speed Vm can then be calculated, knowing the distance between point P1 and point P2 along the surface of cornea 6. For example, this distance is automatically acquired by control unit 42 prior to the execution of step 1000.

Finally, during a step 1012, a mechanical property of the material 2 is automatically determined by control unit 42, using the propagation speed Vm calculated during step 1002. In this example, an elasticity coefficient of the cornea 6 is automatically determined with a predefined relationship and as a function of the average propagation value of the Lamb wave calculated during step 1002. For example, the shear modulus μ of cornea 6 is calculated using the following formula: $\mu=1000\ V^2 m$ where propagation speed Vm is expressed in meters per second and shear modulus μ is expressed in kPa.

Figure 6:
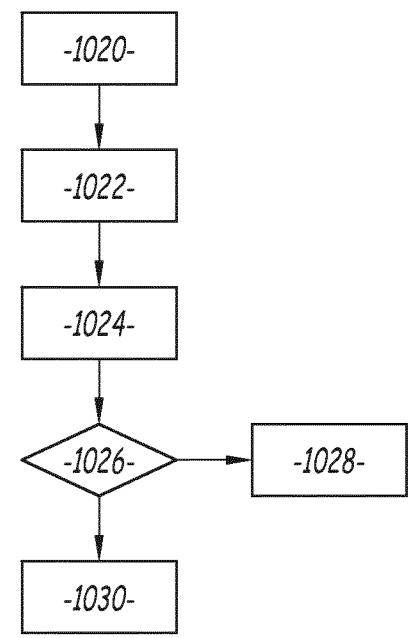
FIG. 6 is a flow chart of a method for testing the effect of an apparatus for creating thermal lesions in the layered soft material of FIG. 1.

A method for testing the effect of an apparatus for creating thermal lesions in the material 2 will now be described in respect to the flow chart of FIG. 6.

Here, apparatus 4 is able to perform two different operations, namely:
generate ultrasonic waves in order to attempt to create thermal lesions in a target region of material 2 and
determine the mechanical property of this material 2 before and after the attempt to create the thermal lesion.

In this embodiment, the thermal lesion is to be created in a target region of material 2, for example to treat a structural pathology of material 2. This target region corresponds here to the ciliary body of the eye, the aim being to destroy at least partially said ciliary body in order to decrease intraocular pressure of said eye, for example as part of a treatment against glaucoma. The creation of the thermal lesion modifies the mechanical properties of material 2. This allows one to monitor whether the thermal lesion has been effectively created.

Figure 4:
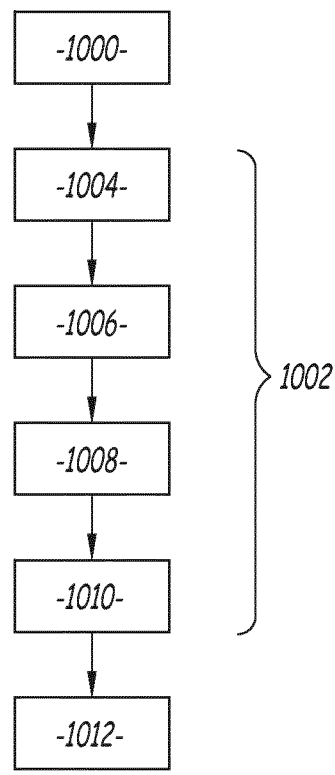
FIG. 4 is a flow chart of a method for determining a mechanical property of the layered soft material of FIG. 1, using the apparatus of FIG. 1.

During a first step 1020, a mechanical property of the material 2 is automatically determined, for example according to the method implementing steps 1002 to 1020 of FIG. 4, using apparatus 4. The first value of the mechanical property determined is then automatically stored in data storage unit 422.

Then, during a step 1022, a high intensity ultrasound wave is generated by ultrasonic transducer 401. This high intensity wave is focused towards said target region of material 2 in order to create a thermal lesion in this target region. For example, transducer 401 is excited by driver 440 with an excitation signal having an amplitude at least one time higher than the amplitude of the excitation signal delivered by driver 440 to generate the ultrasound waves during step 1000. The length of this excitation signal is of at least 1.5 second and preferably 1 second or ten seconds. Preferably, this excitation signal is continuous. Step 1022 is described in greater detail in EP 2 092 916 A1.

Then, during a step 1024, the same mechanical property of the material 2 is determined again at point P2, using apparatus 4. For example, this step 1024 is identical to step 1022. The second value of the mechanical property determined is automatically stored in the data storage unit 422 of control unit 42.

During a step 1026, the results of the determination of steps 1020 and 1024 are automatically compared, for example by unit 42. If the second value of the mechanical property determined during step 1024 differs from the first value of this mechanical property determined during step 1020 by more than 1%, preferably 75% step 1022 is considered to have had a successful effect and the thermal lesion effectively created. Then, during a subsequent step 1028, control unit 42 generates a positive result signal, for example to be automatically displayed on a user interface of apparatus 4.

Alternatively, if said first and second values do not differ from each other by more than 1%, preferably 75%, then, step 1022 is said to have had an unsuccessful effect. During a subsequent step 1030, control unit 42 generates a negative result signal, for example to be displayed on the user-interface.

Figure 7:
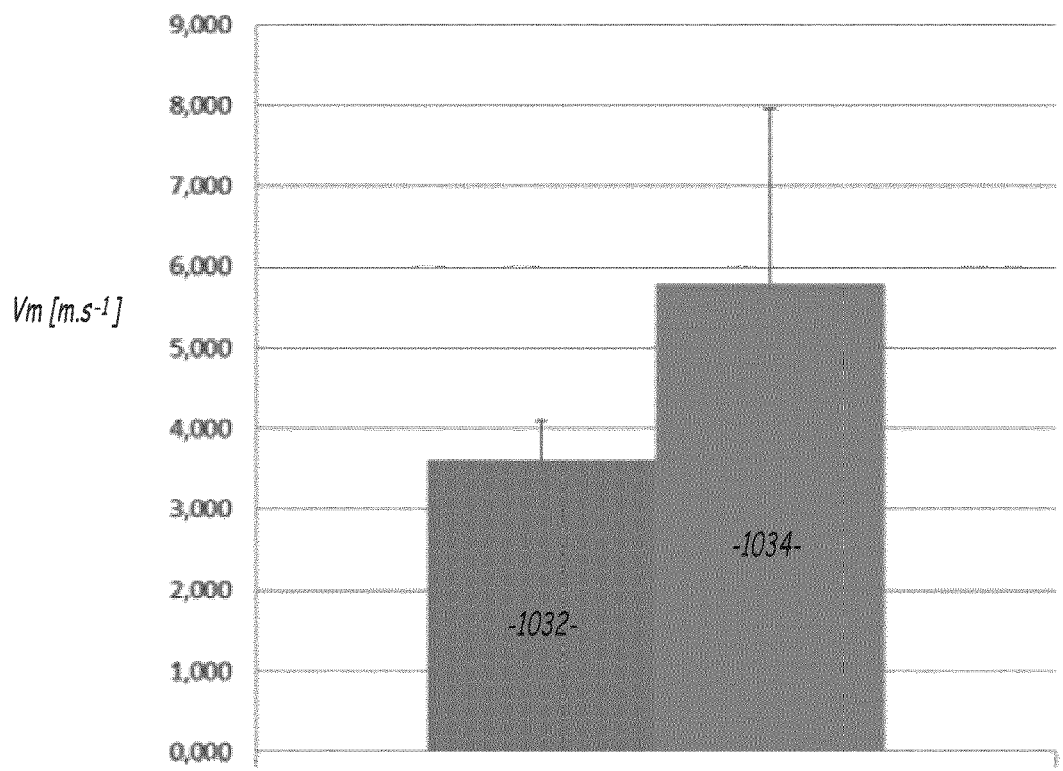
FIG. 7 is a graph illustrating different values of the same mechanical properties as determined by the apparatus of FIG. 1, before and after the application of thermal lesions in this material, using the measurement method of FIG. 4.

FIG. 7 illustrates the result of a comparison between said values. Bar graph 1032 represents the propagation speed of the Lamb wave at the surface of cornea 6, as measured during step 1020. In this specific example, the material 2 is a pig eye. Bar graph 1034 represents the propagation speed Vm, expressed in meters per second (m/s) as measured on the same eye for the same point P2 during step 1024, that is to say after the application, during step 1022, of an high intensity ultrasound wave during a length of six seconds followed immediately by a pause of ten seconds during which no ultrasound wave was generated by the transducer of the apparatus 4. This propagation speed is equal to 5795 m/s. By comparison, the previous speed was equal to 3614 m/s. This corresponds to a raise of more than 60%. In this case, step 1022 is considered to have been successful.

Thanks to this method, it is possible to use the same apparatus 4 to apply the thermal lesions and to measure the mechanical properties of the material 2, in order to monitor, in real time, whether the application of the high intensity ultrasound wave during step 1022 has been effective or not in creating the thermal lesion. In the prior art, using known techniques, it would have been necessary to use at least two different apparatuses, one for performing the measurements and the other to generate the high intensity ultrasound wave to generate the thermal lesion. A major drawback of this prior art approach is that the apparatuses would have to be repositioned and recalibrated every time an operator wishes to perform a measurement. A further drawback is that such frequent switching between different apparatuses might have the unwanted result of damaging material 2. This is deeply problematic when the material 2 is fragile, for example when material 2 is a sensitive biological organ of a patient, such as an eye.

Many other embodiments are possible. The measured physical parameter of the Lamb waves might be different. For example, the measured physical parameter is representative of the amplitude of the Lamb wave at the second point P2 of the material 2. Thus, step 1002 is modified in consequence. Alternatively, during step 1026, a comparison is performed directly on this measured amplitude of the Lamb wave and not necessarily of the determined mechanical parameter of the material 2.

Apparatus 4 can be different.

Transducer 402 is not necessarily identical to transducer 401. For example, their respective oscillator is a capacitance-based oscillator.

The invention claimed is:

1. An apparatus configured for determining a mechanical property of a layered soft material and configured for creating thermal lesions in the layered soft material, wherein said layered soft material is an eye, comprising:
a first ultrasonic transducer, configured to generate an ultrasound wave towards a first point of the layered soft material, in order to generate in turn a Lamb wave propagating into a layer of said layered soft material, at least one second ultrasonic transducer, the at least one second ultrasonic transducer being configured to measure a physical parameter of the generated Lamb wave at a predetermined single second point of the layered soft material, the physical parameter being representative of the amplitude of the Lamb wave at the predetermined single second point of the layered soft material, the at least one second ultrasonic transducer being distinct from the first ultrasonic transducer, the first and the at least one second ultrasonic transducer being located opposite to each other with respect to a central axis of a transducer unit, said predetermined single second point belonging to said layer, said at least one second ultrasonic transducer being configured, to that end, to generate multiple excitation ultrasound waves focused towards said predetermined single second point, and to collect multiple reflected ultrasound waves reflected in response by said layered soft material, wherein the apparatus further comprises:

a first ultrasonic driver of the first ultrasonic transducer, configured to deliver a first excitation signal to said first ultrasonic transducer in order to generate said ultrasound wave, the first excitation signal having a duration smaller than or equal to 50 ms, a second ultrasonic driver of the at least one second ultrasonic transducer, configured to deliver a second excitation signal to the at least one second ultrasonic transducer to generate the multiple excitation ultrasound waves, the second excitation signal having a duration smaller than or equal to 0.5 ms, and configured to collect a measurement signal representative of the physical parameter of the Lamb wave generated by the at least one second ultrasonic transducer upon collecting the multiple reflected ultrasound waves, a control unit, programmed to automatically calculate a mechanical property of said layered soft material based upon the collected measurement signal, the first and second ultrasonic transducers each comprise an oscillator having a quality factor equal to or superior to 100.

2. A method for testing the effect of an apparatus for creating thermal lesions in a layered soft material, wherein said layered soft material is an eye, the apparatus for creating the thermal lesions being the apparatus according to claim 1, said method comprising:

i) first measuring a mechanical property of the layered soft material using said apparatus, ii) generating, by exciting the first ultrasonic transducer of said apparatus, a high intensity ultrasound wave focused towards a target region of said layered soft material, in order to create a thermal lesion in said target region, with an excitation signal during at least 0.5 seconds, iii) second measuring the same mechanical property of said layered soft material as measured in step i), using said apparatus, and iv) automatically comparing the difference in the mechanical properties measured during steps i) and iii) to determine whether step ii) had a successful effect, wherein if the mechanical properties measured during steps i) and iii) differ from each other by more than 75%, step ii) is determined to have had a successful effect and if the mechanical properties measured during steps i) and iii) do not differ from each other by more than 75%, step ii) is determined to have had an unsuccessful effect.

3. The apparatus of claim 1, wherein the first and second ultrasonic transducers are identical.

4. The apparatus of claim 1, wherein the first and second ultrasonic transducers are therapeutic ultrasound transducers.

5. The apparatus of claim 1, wherein the apparatus comprises at least two second ultrasonic transducers, each configured to measure said physical parameter at said predetermined single second point.

6. A method for testing an effect of an apparatus configured for creating thermal lesions in a layered soft material and configured for measuring a mechanical property of the layered soft material, wherein said layered soft material is an eye, the apparatus comprising:

a first ultrasonic transducer, configured to generate an ultrasound wave towards a first point of the layered soft material, in order to generate in turn a Lamb wave propagating into a layer of said layered soft material, at least one second ultrasonic transducer, the at least one second ultrasonic transducer being configured to measure a physical parameter of the generated Lamb wave at a predetermined single second point of the layered soft material, the physical parameter being representative of the amplitude of the Lamb wave at the predetermined single second point of the layered soft material, the at least one second ultrasonic transducer being distinct from the first ultrasonic transducer, the first and the at least one second ultrasonic transducer being located opposite to each other with respect to a central axis of a transducer unit, said predetermined single second point belonging to said layer, said at least one second ultrasonic transducer being configured, to that end, to generate multiple excitation ultrasound waves focused towards said predetermined single second point, and to collect multiple reflected ultrasound waves reflected in response by said layered soft material, wherein the apparatus further comprises:

a first ultrasonic driver of the first ultrasonic transducer, configured to deliver a first excitation signal to said first ultrasonic transducer in order to generate said ultrasound wave, the first excitation signal having a duration smaller than or equal to 50 ms, a second ultrasonic driver of the at least one second ultrasonic transducer, configured to deliver a second excitation signal to the at least one second ultrasonic transducer to generate the multiple excitation ultrasound waves, the second excitation signal having a duration smaller than or equal to 0.5 ms, and configured to collect a measurement signal representative of the physical parameter of the Lamb wave generated by the at least one second ultrasonic transducer upon collecting the multiple reflected ultrasound waves, and a control unit, programmed to automatically calculate a mechanical property of said layered soft material based upon the collected measurement signal, wherein the first and second ultrasonic transducers each comprise an oscillator having a quality factor equal to or superior to 100, said method comprising:

i) first measuring a mechanical property of the layered soft material using said apparatus, ii) generating, by exciting the first ultrasonic transducer of said apparatus via the control unit, a high intensity ultrasound wave focused towards a target region of said layered soft material, in order to create a thermal lesion in the target region, with an excitation signal during at least 0.5 seconds, iii) second measuring the same mechanical property of said layered soft material as measured in step i), using said apparatus, iv) automatically comparing the difference in the mechanical properties measured during steps i) and iii) using the control unit to determine whether step ii) had a successful effect, wherein if the mechanical properties measured during steps i) and iii) differ from each other by more than 175%, step ii) is determined to have had a successful effect and if the mechanical properties measured during steps i) and iii) do not differ from each other by more than 75%, step ii) is determined to have had an unsuccessful effect.

7. The method according to claim 6, wherein the mechanical property of the layered soft material is representative of the elasticity of said layer of the layered soft material.

8. The method of claim 6, wherein the high intensity ultrasound wave of step ii) has a frequency comprised between 1 MHz and 50 MHz.

9. The method of claim 6, wherein said physical parameter of the Lamb wave is obtained automatically from the collected multiple reflected ultrasound waves using a speckle tracking method.

10. The apparatus according to claim 1, wherein said layer is a cornea of said eye, wherein said first point is located at a junction between cornea and sclera, and wherein said predetermined single second point is located at the junction between cornea and sclera opposite to the first point.

11. The method according to claim 6, wherein said layer is a cornea of said eye.

12. The method according to claim 11, further comprising measuring a variation over time of a displacement of cornea in an immediate vicinity of said predetermined single second point, the time of displacement being measured using a time of flight calculation method.

13. The method according to claim 11, wherein said first point is located at a junction between cornea and sclera, and wherein said predetermined single second point is located at the junction between cornea and sclera opposite to the first point.

* * * * *